2 Sheets—Sheet 1.

J. H. ALLYN.
Check-Row Corn-Planter.

No. 216,775. Patented June 24, 1879.

Witnesses:
Fred. G. Dieterich
J. R. Littell

Inventor:
John H. Allyn,
by C. A. Snow & Co.
Att'ys.

2 Sheets—Sheet 2.

J. H. ALLYN.
Check-Row Corn-Planter.

No. 216,775. Patented June 24, 1879.

Witnesses:
Fred G. Dieterich
J. R. Littell

Inventor,
John H. Allyn,
by C. A. Snow & Co.
Att'ys.

N. PETERS, PHOTO-LITHOGRAPHER, WASHINGTON, D. C.

UNITED STATES PATENT OFFICE.

JOHN H. ALLYN, OF MORMONTOWN, IOWA.

IMPROVEMENT IN CHECK-ROW CORN-PLANTERS.

Specification forming part of Letters Patent No. 216,775, dated June 24, 1879; application filed April 22, 1879.

*To all whom it may concern:*

Be it known that I, JOHN H. ALLYN, of Mormontown, in the county of Taylor and State of Iowa, have invented certain and new useful Improvements in Check-Row Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
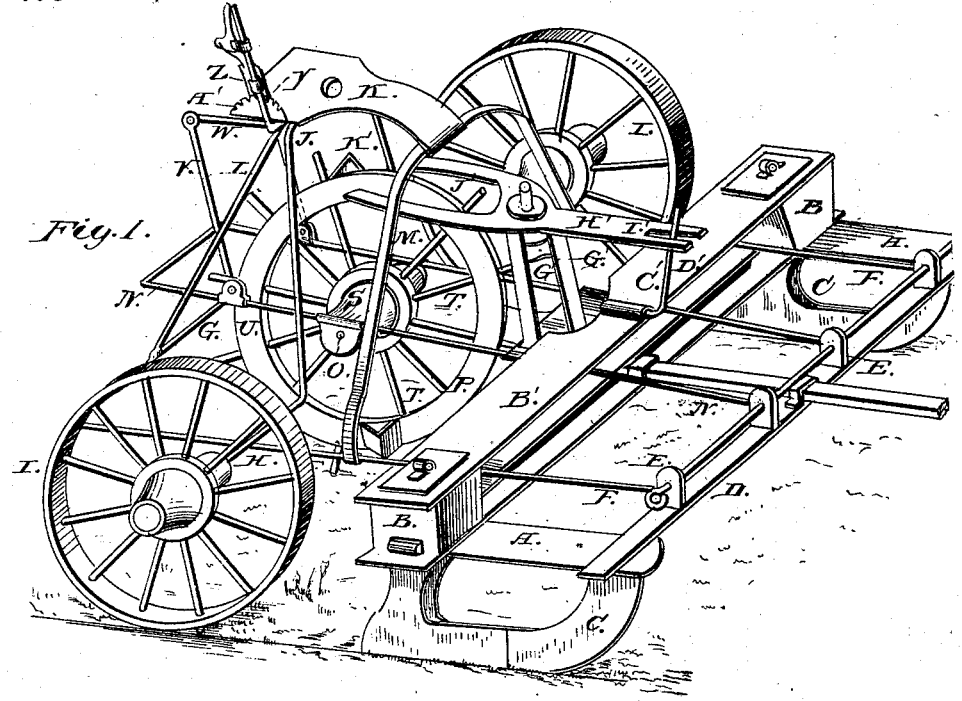
Figure 2:
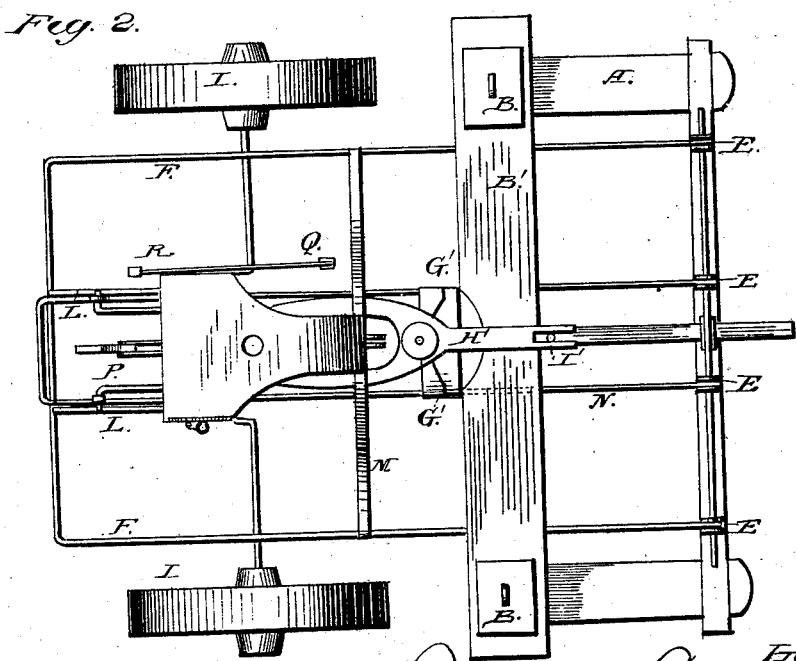
Figure 3:
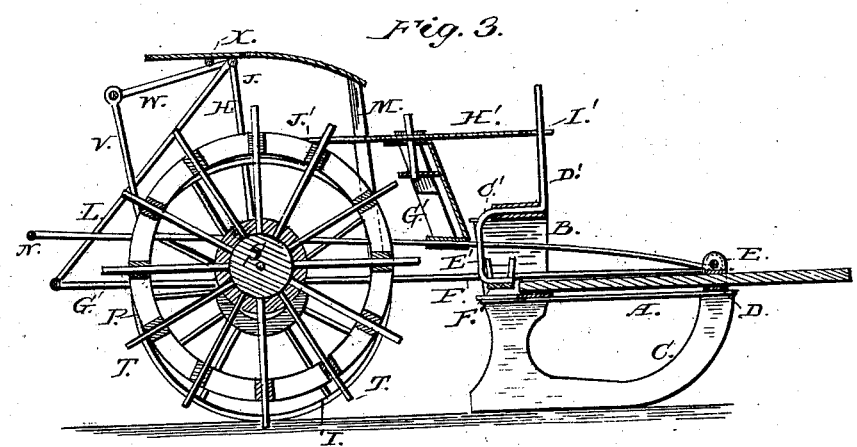
Figure 4:
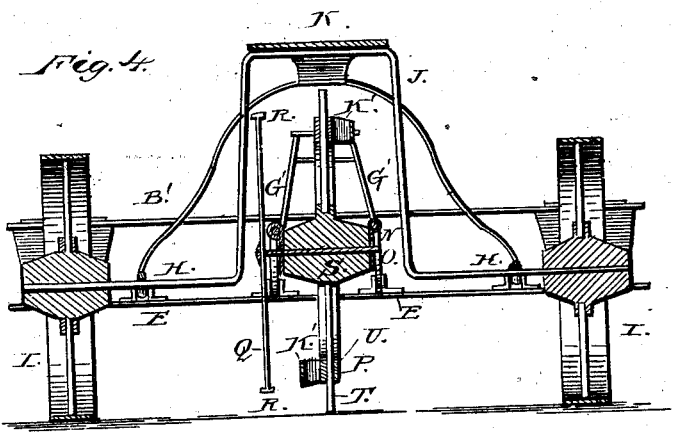

Figure 1 is a perspective view. Fig. 2 is a top view. Fig. 3 is a longitudinal vertical section, and Fig. 4 is a cross-section.

Corresponding parts in the several figures are denoted by like letters of reference.

This invention relates to check-row corn-planters; and it consists in certain improvements in the construction of the same, which will be hereinafter fully described, and particularly pointed out in the claims.

In the drawings, A represents a frame carrying the seed-boxes B B, and supported upon the colters or furrow-openers C C, all of which are of the usual construction.

The front cross-bar, D, of frame A is provided with a series of lugs, E E, to two of which the side bars, F F, of the main frame G are hinged, as shown.

H is the axle, which is solidly secured to the frame G, and carries the wheels I I. The axle H is arched, as shown at J, and it carries the driver's seat K, which is supported by braces L M, extending downwardly to frame G.

N is a frame, the sides of which are hinged in the two central lugs, E, of the front cross-bar, D, of frame A. Said frame extends rearwardly under the arc J of axle H, and carries in suitable bearings a shaft, O, having the drive-wheel P and marker Q. The latter is a simple cross-bar, suitably secured upon the shaft, and having heads or ends R R.

The drive-wheel consists of a hub, S, having radiating rods or spokes T, the ends of which projecting beyond the rim U are flattened and sharpened, so as to penetrate the ground when the machine is in operation.

The frame N is provided with upwardly-projecting hinged arms or levers V, the upper extremities of which are hinged to arms W, projecting rearwardly from a transverse shaft, X, mounted in suitable bearings under the driver's seat. The shaft X is provided with an upwardly-projecting arm or lever, Y, having a spring-catch, Z, which engages a segmental rack, A', secured upon the side of the driver's seat. By this mechanism the rear end of the frame N, with the drive-wheel and marker, may at any time be raised from the ground, so as to be thrown out of operation.

The seed-boxes B B are connected by a cross-bar, B', upon which a bearing is formed for a shaft, C', having an upwardly-projecting arm, D', and a downwardly-projecting arm, E', which latter is suitably connected to the seed-slide F'.

The frame N is provided with uprights G', having vertical bearings for a horizontally-swinging plate, H', the front end of which has a slot, I', receiving the arm D' of shaft C', and the rear end of which is forked, as shown at J', so as to embrace the drive-wheel P. The latter is provided with triangular projections or cams K', arranged on opposite sides, so as to engage alternately the arms of fork J', and thus, through the mechanism described, operate the seed-slide. The seeding mechanism may be of any desired construction.

The operation of my invention will be readily understood. When the drive-wheel travels upon the ground the seeding mechanism is operated as described. When it is desired to stop the seeding mechanism, in turning the machine or transporting it, the lever mechanism V W X Y is operated to raise the drive-wheel from the ground, thus throwing it out of operation.

Owing to the construction of the drive-wheel above described clods, straws, &c., will be cut or penetrated by the spokes, thus making the planting even and uniform.

Having thus described my invention, I claim and desire to secure by Letters Patent of the United States—

1. The combination of the frame A with the hinged frame G, having the axle and transporting-wheels, and hinged frame N, having the drive-wheel and marker, both of which said frames are hinged to the front cross-bar, D, of frame A, so as to be capable of being operated independently of each other, substantially as and for the purpose set forth.

2. The combination, with the frame A, carrying the seed-boxes and furrow-openers, of the frame G, having the axle and transporting-wheels, the frame N, having the drive-wheel P, both of which said frames are hinged to the front cross-bar, D, of frame A, and the lever mechanism V W X Y, by which the frames G N may be adjusted in relation to each other independently of the frame A, as set forth.

In testimony that I claim the foregoing I have hereunto set my hand this 11th day of April, 1879.

JOHN H. ALLYN.

Witnesses:
   Dr. A. WHITE,
   THOMAS KING.